US010482225B1

(12) United States Patent
Abdulhayoglu et al.

(10) Patent No.: US 10,482,225 B1
(45) Date of Patent: Nov. 19, 2019

(54) METHOD OF AUTHORIZATION DIALOG ORGANIZING

(71) Applicants: Melih Abdulhayoglu, Montclair, NJ (US); Albert Vik, Odesa (UA)

(72) Inventors: Melih Abdulhayoglu, Montclair, NJ (US); Albert Vik, Odesa (UA)

( * ) Notice: Subject to any disclaimer, the term of this patent is extended or adjusted under 35 U.S.C. 154(b) by 0 days.

(21) Appl. No.: 14/799,232

(22) Filed: Jul. 14, 2015

(51) Int. Cl.

| | |
|---|---|
| ***G06F 21/10*** | (2013.01) |
| ***G06F 21/32*** | (2013.01) |
| ***G07C 9/00*** | (2006.01) |
| ***G06K 7/10*** | (2006.01) |
| ***G06F 21/31*** | (2013.01) |

(52) U.S. Cl.
CPC .............. *G06F 21/32* (2013.01); *G06F 21/31* (2013.01); *G06K 7/10009* (2013.01); *G07C 9/00158* (2013.01)

(58) Field of Classification Search
CPC .......... G06F 21/31; G06F 21/32; G06F 21/34; G06F 21/35; G06F 21/36; G06F 21/45
See application file for complete search history.

(56) References Cited

U.S. PATENT DOCUMENTS 7,701,364 B1 4/2010 Zilberman
8,024,775 B2 9/2011 Xu et al.
8,112,066 B2 2/2012 Ben Ayed
8,214,892 B2 7/2012 Cohen et al.
8,392,975 B1 3/2013 Raghunath
8,627,438 B1 1/2014 Bhimanaik
8,640,227 B2 1/2014 Taxier et al.
8,739,260 B1 5/2014 Damm-Goossens
2003/0018915 A1 1/2003 Stoll
2003/0120934 A1* 6/2003 Ortiz .................. H04L 63/0861 713/186
2004/0208348 A1* 10/2004 Baharav ................ G06F 3/0421 382/124
2006/0101508 A1 5/2006 Taylor
2007/0186115 A1 8/2007 Gao et al.
2007/0277224 A1 11/2007 Osborn et al.
2015/0186083 A1* 7/2015 Sugiyama ............. G06F 3/1238 358/1.14

OTHER PUBLICATIONS

Dobromir Todorov Mechanics of User Identification and Authentication: Fundamentals of Identity Management Auerbach Publications, Taylor & Francis Group ISBN 978-1-4200-5219-0 2007, USA.

* cited by examiner

*Primary Examiner* — Edward Zee
(74) *Attorney, Agent, or Firm* — Joseph P. Aiena

(57) ABSTRACT

The invention discloses a method and system for presenting user alternatively organized authorization page. The login and password options on this page will be supplemented with biometric parameters check, image-based code check, or other applicable authentication methods.

12 Claims, 18 Drawing Sheets

Server/
authenticator
User authentication
User authentication
User/
supplicant
User authentication
Secure communication channel
Security server/
security database/
authentication database
User account
Credentials:
User ID/Logon ID
Biometrics
PIN numbers
Certificates FIG. 4
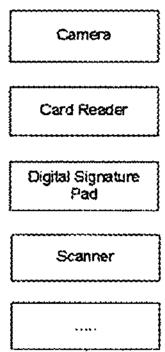
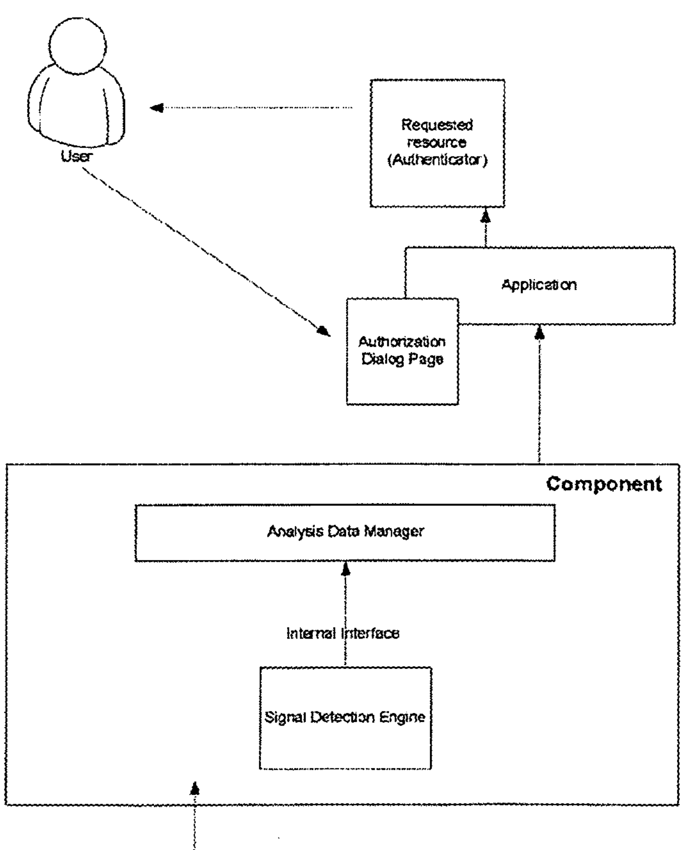

12
Sensor
14
Compression
Re-expansion
Inadvertent addition of noise
Transmission
Signal conditioning hardware
16
Amplifier 18
Signal filter 20
Signal isolator 22

Equipment
9
CPU
24
Network adapter
26
Server
7
Send verdict
Check template
Save template for future comparision
Database
8
Matcher 28

Card reader enabled
Card reader authentication option
Authorization Application
Card Reader
User
Smart Card
Authorization Dialog Page
Settings options
Verification is successful
Website

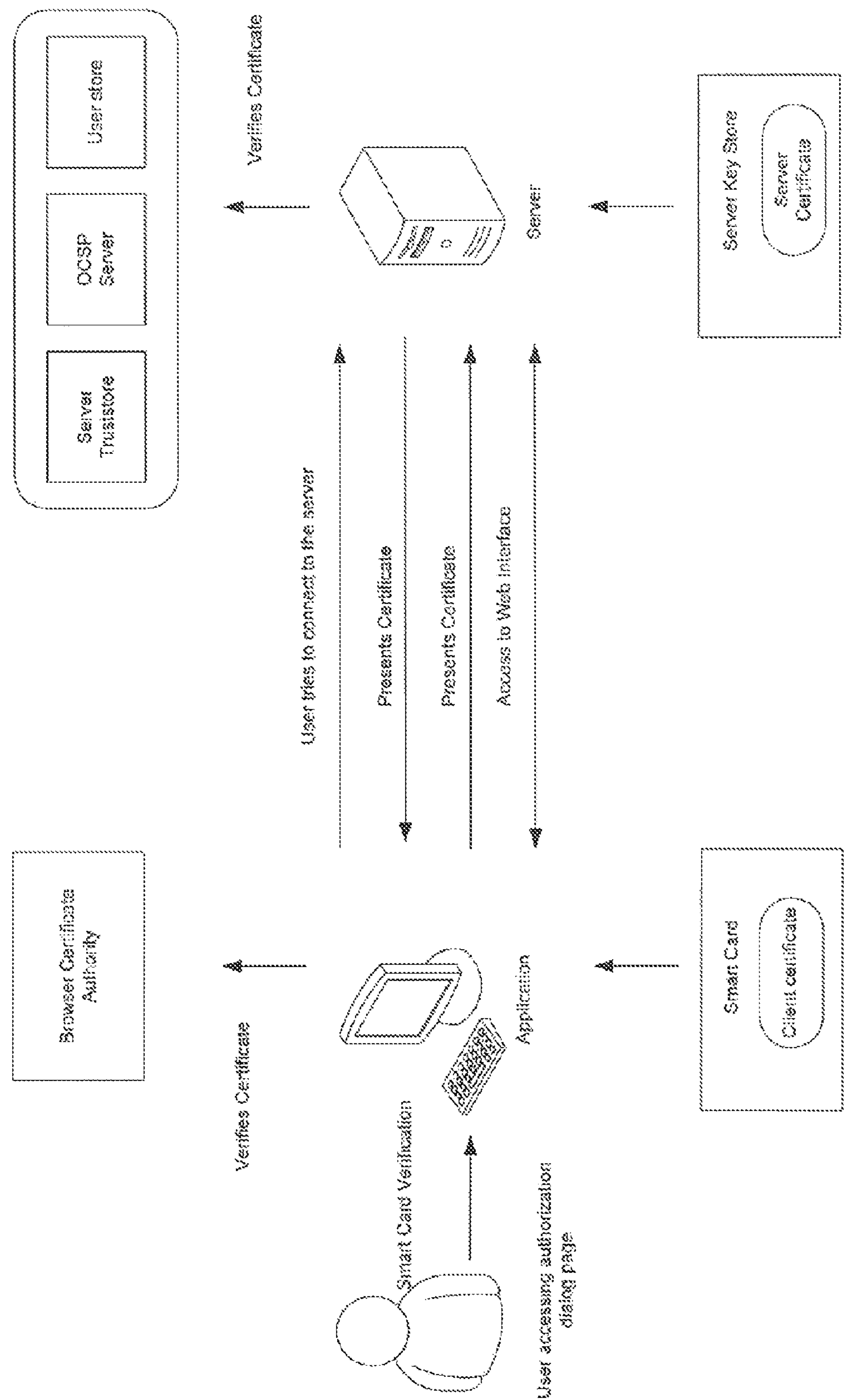

FIG. 8
Server Truststore
OCSP Server
User store
Verifies Certificate
Server
Server Key Store
Server Certificate
User tries to connect to the server
Presents Certificate
Presents Certificate
Access to Web interface
Browser Certificate Authority
Verifies Certificate
Application
Smart Card
Client certificate
Smart Card Verification
User accessing authorization dialog page User signs in to account
User decides to change security settings
User is proposed list of possible choices
Option1
Option 2
Option 3
Option n
User chooses several options depending on the desirable security level
Next time user signs in authorization page displays request for corresponding to option 2 and option 3 parameters User signs in to account
User decides to change security settings
User is proposed list of options based on available software and hardware
User chooses one option
User chooses several options depending on the desirable security level
Next time user signs in authorization page displays request for corresponding to chosen option(s) parameters User is trying to access system
Displayed authorization page contains all known to system authorization options
User inputs required data
Authentication is successful
Authentication failed
Access is permitted
Access is forbidden, user gets no explanation as to reasons of authentication failure

METHOD OF AUTHORIZATION DIALOG ORGANIZING

CROSS-REFERENCE TO RELATED APPLICATION

This application claims the benefit of priority to U.S. Provisional Application No. 62/024,547, filed Jul. 15, 2014 which is incorporated herein in its entirety by reference.

BACKGROUND

Usually basic access authentication requires user name and password that are inputted via web browser or other client program. This method is very popular and it is supported by many applications, though users tend to forget their logins and passwords, and thus block access to their accounts.

The alternative to login and password authorization can be authorization based on biometric identifiers. It is rather complicated to stole and use biometrics to access personal information. So biometrics can be effectively used as physical access granting systems, also biometrics data can serve as a permission or restriction for some group or individuals to get some services or rights.

Fingerprint recognition includes recording fingertips characteristics like whorls, arches, loops, pattern of ridges, furrows that captured with optical CCD or CMOS image sensor. Though fingerprints can be obtained from latent prints occasionally left on objects and majority of readers do not check for the "live" finger.

Face recognition supposes that face images are recorded and analyzed. Measurements are broken into facial planes and kept in database, so to be further used for comparison. However the face proportions change as people grow old so the data should be constantly updated, besides the video equipment for that recognition can be rather costly.

Speech authentication includes fundamental frequency, nasal tone, cadence, inflection, but it is hard to get accurate results when there is environmental background noise.

Iris recognition analyzes features like rings, furrows, freckles of the colored tissue around the pupil and use regular video camera. Though effectiveness of the results significantly depends on the lighting and user positioning.

While applying hand recognition technology the image of the hand or two fingers of the hand are captured by camera, the silhouette is extracted and characteristics are stored. But the authentication can fail if by chance people would have the same geometry of the hand.

Retina recognition uses infrared scanning; it compares images of the blood vessels in the back of the eye. Now it is used in high-end security applications like military installations and power plants. The big drawback is that it requires expensive equipment and harmful for human eye.

Signature recognition is widely used now and is based on features like number of interior contours and number of vertical slope components. The disadvantage is that it can change with the time or be reproduced by professional forgers.

As a result authentication through biometrics though being highly secure method also provides room for falsification and requires expensive equipment.

As another option for authentication there can be considered radio-frequency identification (RFID). Here the data are transferred by electromagnetic fields which make possible automatic identification and tracking tags attached to objects. The tags contain electronically stored information. Devices with such tags can be powered by electromagnetic induction from magnetic fields produced near the reader, or collect energy from the interrogating radio waves and act as a passive transponder. Or have a local power source such as a battery and may operate at hundreds of meters from the reader. Since RFID tags can be attached to any possessions, or implanted in animals and people, there is high risk that personal information may be read without aware of the owner. So the usage of such method may jeopardize the sensitive data that can be captured by malicious third parties.

One more authentication method is the near field communication technology (NFC), used in various devices (like smartphones) to establish radio communication with each other by touching the devices together or bringing them into close distance. Each NFC device can work as NFC Card Emulation, as NFC Reader/Writer and as NFC peer-to-peer (P2P mode). In the mode of NFC Card emulation such devices as smartphones are able to act like smart cards, allowing users to perform transactions like payment or ticketing. NFC tags typically contain data placed in secure personal data storage, e.g. debit or credit card information, loyalty program data, Personal Identification Numbers (PINs), contacts.

There can be provided authentication via smart card, a pocket-sized card with embedded integrated circuits. It is effectively used for single sign-on (SSO) within large organizations. Also having card reader installed it can be used as authorization facility for access to some sensitive information stored on local computer, in local network or Internet.

One more variant for authentication is to compose unique image from various segments, and then use predetermined "correct" image as a basis for security functions for device. Accordingly to Tobias Marciszko et al, image, serving as a code, is divided into segments. A user may construct a unified image based on the selected segments. For example, a user may change the top portion of the image (woman's head wearing a baseball cap) to another image (e.g., a man's head wearing a fireman's helmet), such as those shown in US 20110096997A1.

The major disadvantage of this approach is that another person that happens to be nearby would be able to oversee and remember the unique picture.

Thus, there is a need for new method of authorization dialog organizing that would be enough safe, quick and comfortable for user and that could be adjusted accordingly to user's needs.

SUMMARY OF INVENTION

The disclosed invention is a method and system for organizing user's authorization page by adding alternative to login and password options.

The invention works by providing user with possibility to choose authentication method in each specific case. It can be traditional login and password combination, biometric data input, composing unique image, etc. Since new method supplements (but does not exclude) the authentication via login and password parameters, they altogether significantly raise the safety and convenience of the system.

Authentication methods applied separately may require equipment that is not necessary installed on all devices which can be used for authentication sessions. Though our invention eliminates this problem by providing the most applicable method of authentication from available ones or/and provide users the option to choose the desired method themselves. For example, user may choose iris scan if in that specific case the hand scan is not possible, though usually user is getting authenticated through hand scanning. In some situations when it is necessary to keep high security level there can be chosen the combination of several authentication methods like iris and hand scan at the same time.

Suitably the choice of authentication option may be a compromise between the complexity of user's actions (for example, necessity to install new software and hardware for biometric data recognition) and level of security required from user when they are engaged in specific activity.

BRIEF DESCRIPTION OF DRAWINGS

FIG. 4 is an embodiment of invention where biometrics and other personal information is inputted by user, data is analyzed and verdict to grant or restrict the access to the requested resource is announced.

FIG. 8 is an embodiment of invention where user signs in to their account using smart card with certificate.

DETAILED DESCRIPTION

The present invention discloses method and system for presenting user alternatively organized authorization page, where traditional login and password options are supplemented with biometric parameters check, image-based code check (Tobias Marciszko et al), or other applicable authentication methods. Third option will include, but not limited to: fingerprint, palm print, face recognition, iris recognition, inputted through digital pad handwritten signatures, inputting image-based code. Authentication methods can be added to system as separate modules depending on user choice and functional capacity of hardware/software on client side.

Figure 1A:
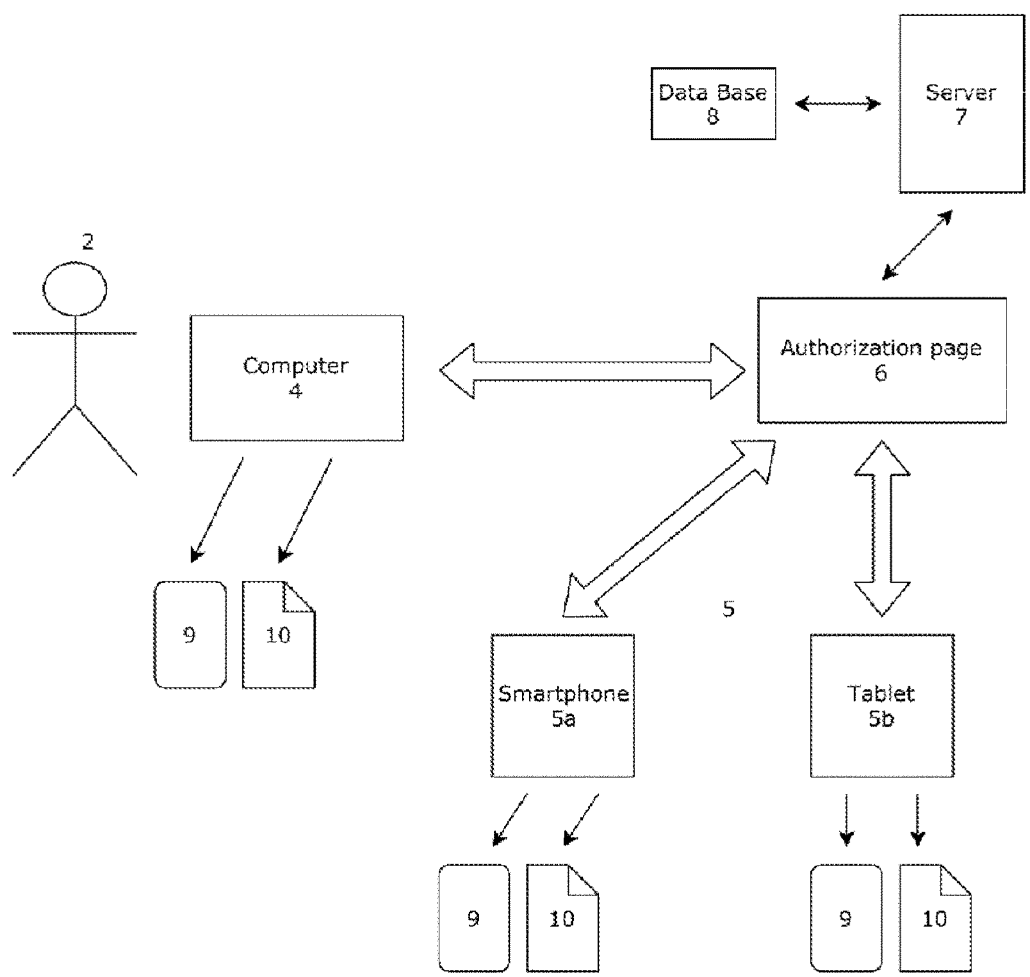
FIG. 1*a* is a depiction of a general scheme of the invention.

As shown generally by FIG. 1*a*, there is a user 2 of a computer 4 or handheld device 5 who is displayed an alternatively organized authorization page 6 for inputting required data, that transmitted via communication channel to a server 7 and database 8. It should be noted that term "server" may refer here to an Internet web server as well as to Intranet server used within one company. Those of skill in the art would recognize that the computer 4 of hand held device 5*a* or 5*b* each may have authentication equipment 9 and installed authentication software 10 to be able to analyze data and provide match result. It should also be noted that as used herein, the term handheld device includes phones, smart phones, tablets, personal digital assistants, media and game players and the like. As used throughout, authentication equipment 9 may refer to fingerprint scanner, facial recognition devices, typing biometric devices, signature recognition devices and like terms known to those of skill in the art.

Figure 1B:
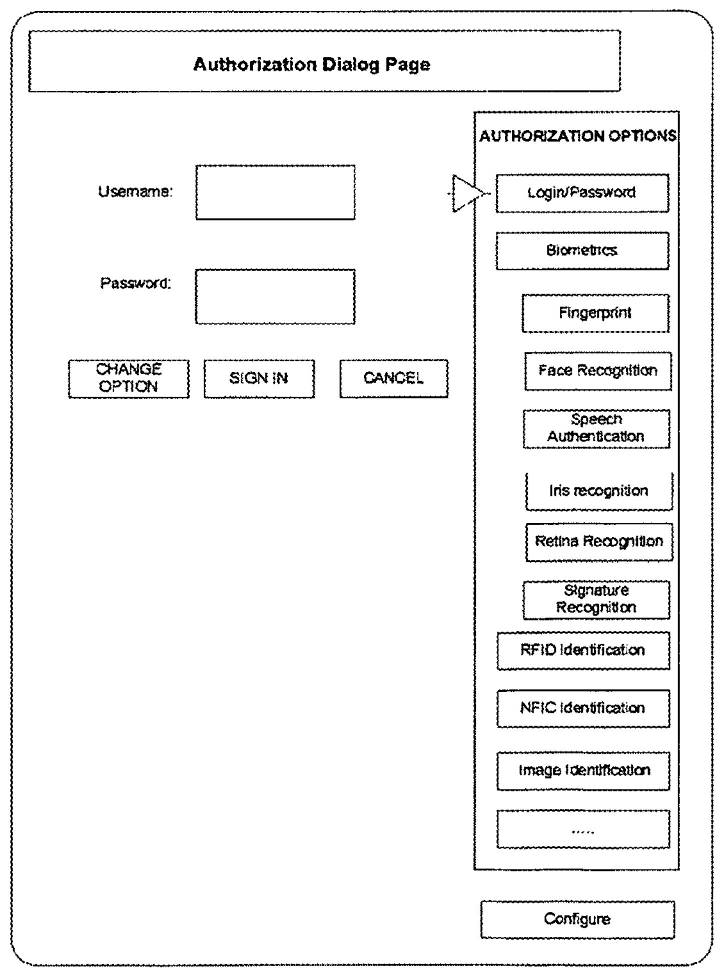
FIG. 1*b* is a depiction of authorization dialog page with login/password authentication.
Figure 1C:
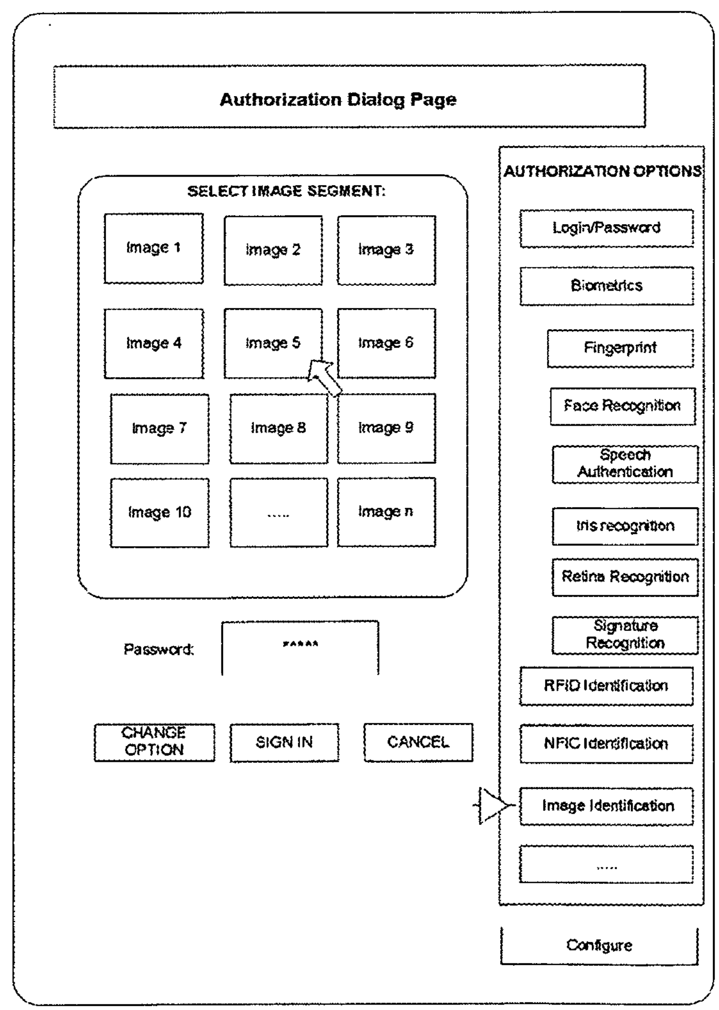
FIG. 1*c* is a depiction of authorization dialog page with image recognition option.
Figure 1D:
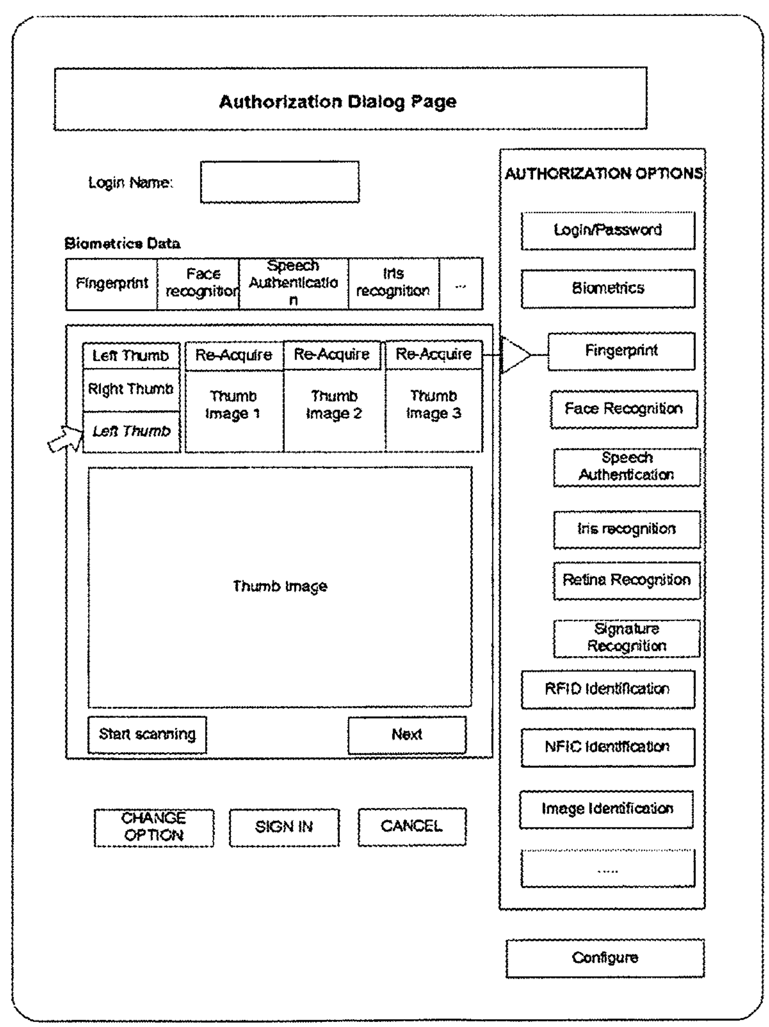
FIG. 1*d* is a depiction of authorization dialog page with fingerprint recognition option.

Here the authorization page displayed to user may provide usual options for login/password authentication as shown on FIG. 1*b*, or user may choose alternative methods, for example image identification or fingerprint recognition, as shown on FIG. 1*c*, FIG. 1*d*. Except traditional options with password and username icons and icons confirming signing in or cancelling action, authorization page contains icon "change option" for enabling another authentication method and "configure" for choosing combination of options. Authorization page contains the panel showing the list of authentication options, including biometrics, RFID identification, NFIC identification, image identification and other applicable methods.

Figure 2:
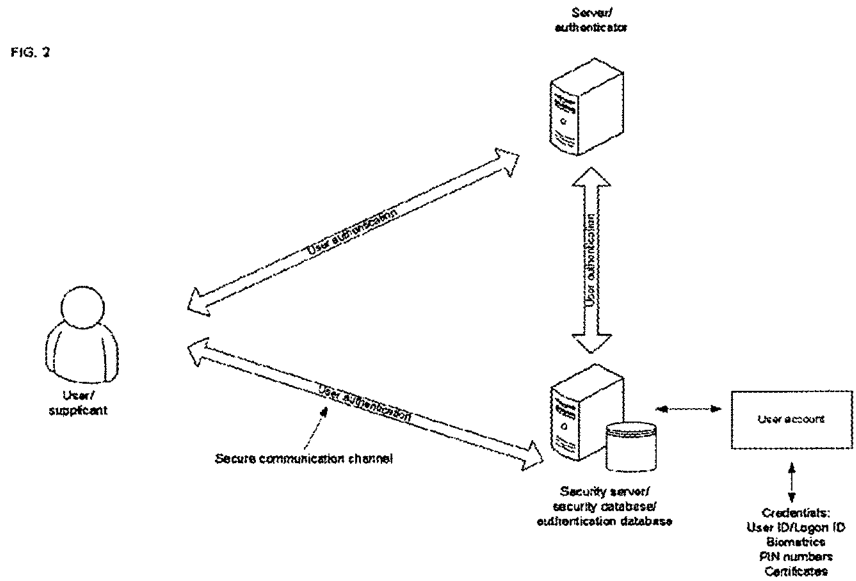
FIG. 2 shows the general scheme of an authentication process and its components.

In FIG. 2 it is shown the general scheme of an authentication process and its components. Authentication (referred to as identification and authentication together) determines and validates user identity before user 2 access to resources granted to an individual. The process of authentication consists of two phases: identification and authentication. Identification provides user identity in the form of a user ID (logon ID) to the security system. User ID is the name of user account that contains a set of attributes for each actual individual and acts is a unique object in security system. The security system will then search through all the objects that it knows and find the specific one for the privileges of which the actual user 2 is currently applying. Once this is complete, the user 2 has been identified. During authentication the user identity is validated by verifying user-provided evidence. To confirm that an actual user can be mapped to a specific abstract user object in the system, and be granted user rights and permissions specific to the abstract user object, the user 2 provides evidence that is credential. Different systems may require different types of credentials to ascertain user identity, and may even require more than one credential. Usually it takes the form of a user password, known only to the individual and the system. Credentials may take other forms, however, including PIN numbers, certificates, tickets, etc.

There are three components involved in the process of user authentication. The supplicant (authenticating user): the party that will provide its identity, the evidence for it and will be authenticated. The authenticator (server): the party that will provide resources to the supplicant and need to ascertain user identity to authorize and audit user access to resources. And the security database: storage or mechanism to check user credentials. This can be file, or a server on the network providing for centralized user authentication, or a set of distributed authentication servers that provide user authentication within the enterprise or on the Internet.

In the common case the supplicant, authenticator and security database may reside on the same computer 4. It is also possible for network applications to have the supplicant on one computer and the authenticator and security database located on another computer. It is also possible to have the three components geographically distributed on multiple computers. In this case there will be required secure communication channels that can be assured by certificates, encryption, etc.

Figure 3:
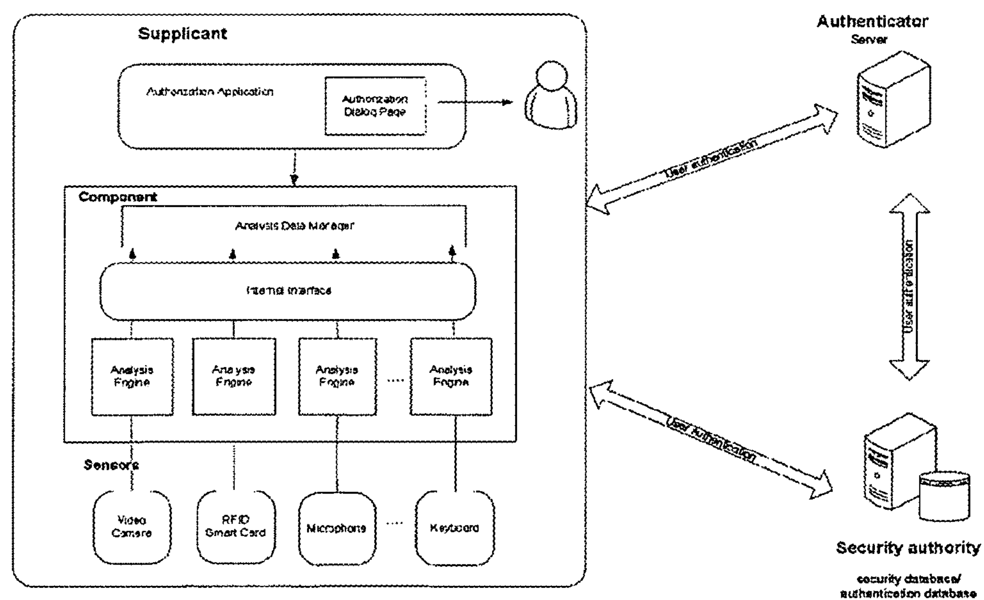
FIG. 3 shows intercommunications within supplicant component.

In FIG. 3 there are shown intercommunications within supplicant component. The component that integrates analysis data and transmits them to application is placed between application 10 and sensors 14. Component consists of the analysis data manager and analysis engines. In step 301 sensors 14 collect various personal data or credentials for authentication through rays of light, radio waves, sound waves, and so on. In step 302 analysis engines analyze raw data from sensors 14 such as video camera, RFID tag, NFC devices, smart card, microphone, etc and generate analysis results which show the personal data characteristics. In step 303 the internal interface displays the analysis result to analysis data manager which in turn, step 304, stores and organize the data retrieved from analysis engines. Analysis data manager has the following functions: invoking analysis engines, storing, integrating and retrieving analysis results generated by analysis engines, providing API to applications and analysis engines. Further in step 305 the required data chosen from the analysis data that managed in the component are retrieved by application 10. In step 306 the authorization application 10 provides user's identity and evidence for it to authenticator and security authority to proceed with user authentication.

In FIG. 4 the biometrics and other personal information is inputted by user 2 via special equipment 9, data is collected and analyzed and the verdict to grant or restrict the access to the requested resource is announced. In step 401 user 2 chooses in authorization page 6 through the authorization application 10 the option to login with biometrics data or data located on RFID tags, NFC devices, etc. In step 402 the equipment 9 like camera, various card readers and scanners, digital signature pad, etc is activated and gets the personal information, or credentials. In step 403 the data is captured by signal detection engine. Then the output of a signal detection engine is stored in the analysis data manager, step 404. In step 405 identity data of user 2 are transmitted from component to authorization application 10. In step 406 the decision whether to grant user 2 access or deny it is taken and access to the requested resource is permitted or restricted.

Figure 5A:
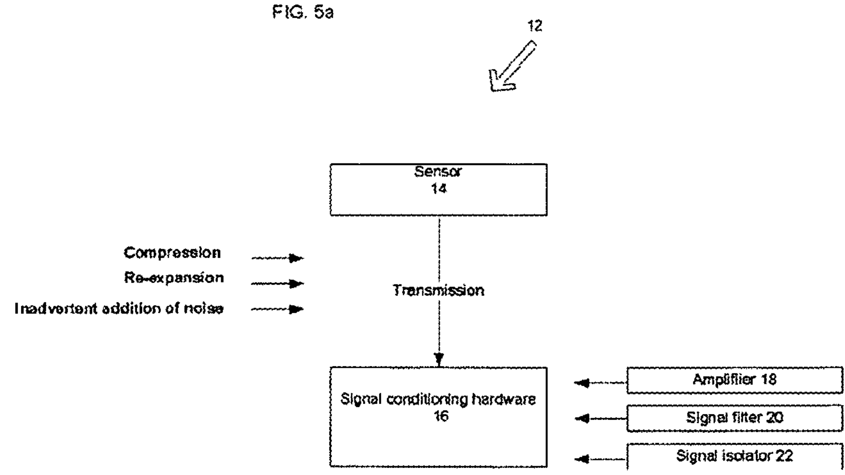
FIG. 5*a* is a depiction of a system of biometric based authentication equipment.
Figure 5B:
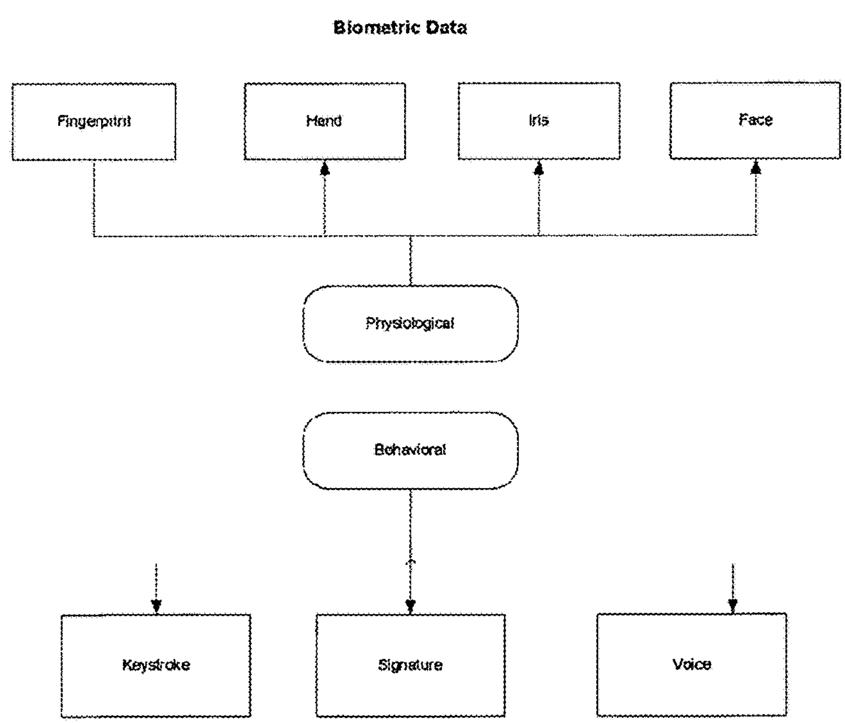
FIG. 5*b* is a depiction of biometric characteristics types.

FIG. 5*a* and FIG. 5*b* illustrate a system 12 of biometric based authentication equipment 9 which includes sensor 14, coupled to signal conditioning hardware 16 comprising amplifier 18, signal filter 20, signal isolator 22.

Necessary for authentication biometric characteristics are scanned by a sensor 14, which measures them and converts physical parameters into a signal. The biometric characteristics can be physiological and behavioral. Behavioral measures the characteristics which are acquired naturally over a time, for example, speaker recognition (voice), signature, keystroke. Physiological biometrics measures the inherent physical characteristics of an individual. These are fingerprints, facial recognition, hand geometry, iris scan, retinal scan, vein pattern, etc. Data collection and processing can occur at different places. So in those cases signal must be transmitted from data collection to the signal conditioning hardware 16. Transmission includes compression, re-expansion and inadvertent addition of noise.

Now signal comes through signal conditioning stage where amplifier 18, signal filter 20, signal isolator 22 and other signal conditioning hardware make sensor output suitable for further processing by extracting only distinctive features from the signal. Amplifier 18 increases the resolution of the inputted signal and increases its signal-to-noise ratio. Filter 20 removes unwanted frequency components from the signal, enhance wanted ones, or both. Isolator 22 passes the signal from the source to the measurement device without a physical connection, or isolates possible sources of signal perturbations.

Figure 6:
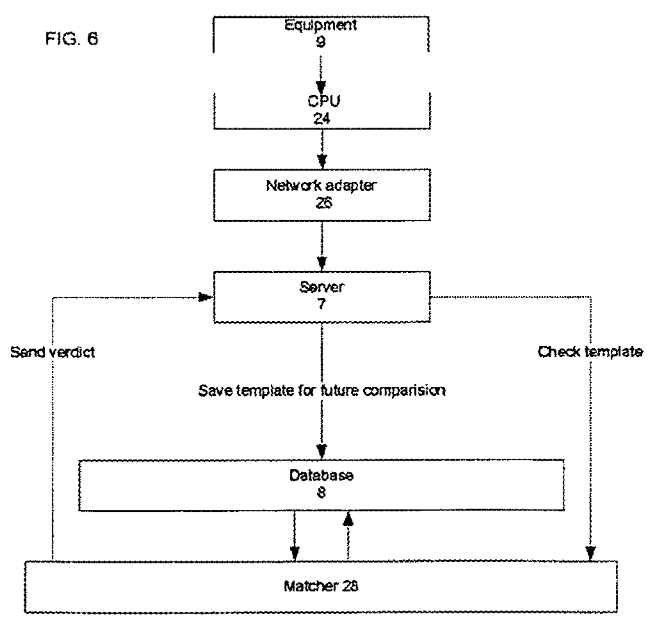
FIG. 6 is a depiction of an algorithm of analyzing signal and making a verdict.

FIG. 6 illustrates an algorithm of analyzing signal and making a verdict where signal received from equipment 9 comes through central processing unit 24 (CPU) of computer 4 and then is transmitted through network adapter 26 via Internet/Intranet to the server 7. Depending on the current task signal can be saved as a template in database 8 for future comparison (if it is entered for the first time) or signal can be sent to matcher 28 to be compared with previously stored templates to confirm/deny user's authorization. Upon received match results verdict is returned to the server 7. If verdict is negative the access to resources is blocked. In various embodiments of the invention, the present system collects biometric data, measures them, and provides user with result.

Figure 7:
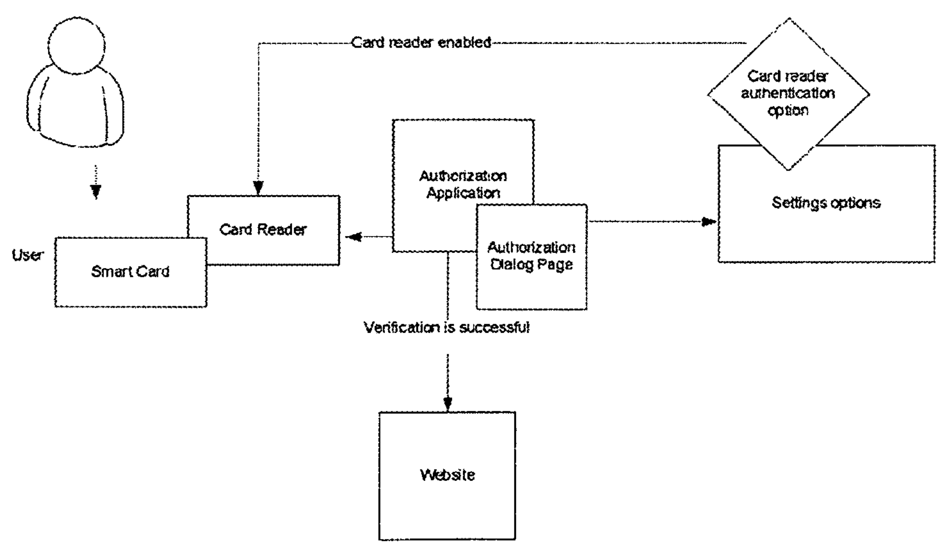
FIG. 7 is an embodiment of invention where user signs in to their account using smart card authentication option.

In FIG. 7 user 2 signs in to their account using smart card authentication option. In step 701 user 2 inserts a smart card 30 into card reader before attempting to enable smart card authentication. Also there should be checked whether RSA key is present on the smart card 30. This RSA key must be capable of encryption and decryption so that card's security can be verified. In step 702 user 2 opens authorization dialog page 6. In step 703 user 2 clicks account settings option. And chooses the card reader authentication option, step 704. In step 705 card reader is enabled. In step 706 information is verified and if verification is successful user 2 is granted the access to the resources, in this particular case the website.

In FIG. 8 user 2 signs in to the account using smart card with certificate. In step 801 user 2 tries to access the required resource via application 10 managing authorization process and connects the server 7. In step 802 server 7 presents certificate to the client for verification. In step 803 client verifies the server's certificate with that of the browser certificate authority. If the process is successful, step 804, the client sends the user's smartcard certificate to the server 7. In step 805 server 7 verifies the client certificate with the server trust store that contains certificates from other parties that user 2 may expect to communicate with or from Certificate Authorities that user 2 trusts to identify other parties, and then checks the revocation status with the Online Certificate Status Protocol (OCSP) server. Additionally in step 806 server 7 checks if the user certificate is same as the one in the local user store. And if the process also succeeds, the authorization application server grants the user 2 access to the web interface, step 807.

Figure 9:
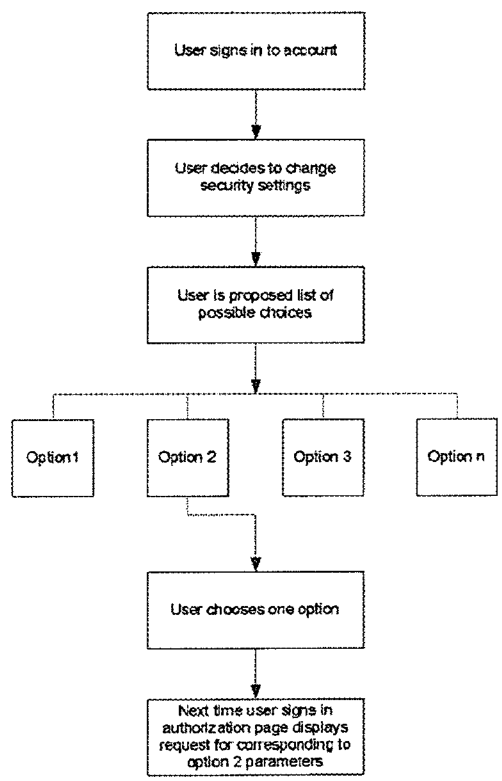
FIG. 9 is a flowchart of another embodiment of invention where user chooses one authentication option.

In another embodiment of the invention, FIG. 9, user 2 signs in to their account. They go to account settings and choose security options. They are proposed list of possible variants: login and password, signature, fingerprints, face recognition, etc. User 2 chooses one option that meets their needs most of all at the moment. After user signs out and then signs in again, chosen by user tab and request to input corresponding parameter are shown on the authorization page 6.

Figure 10:
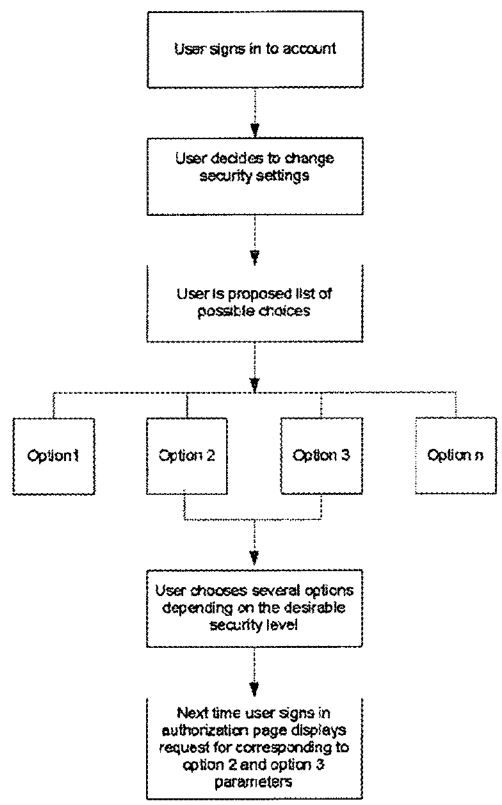
FIG. 10 is a flowchart of the embodiment of invention where user chooses several authentication options.

In other embodiment of the invention, FIG. 10, when user 2 signs into their account to adjust security preferences they may choose combination of several options for authentication depending on the level of security user wants to set to his account. In case data contained in mail account or in other system that requires authorization are vitally important for business or for person, user will be able to set biometry check via image acquisition system 12 altogether with login and password parameters. So next time user 2 signs in, authorization page 6 displays number of tabs and request to input number of parameters chosen by user.

Figure 11:
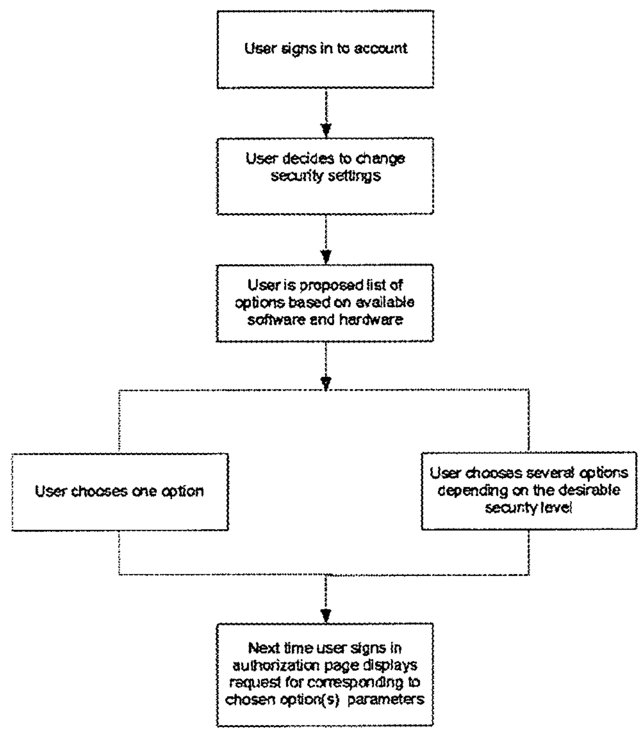
FIG. 11 is a flowchart of the embodiment of invention where user is proposed list of parameters for authentication, based on available software and hardware.

In another embodiment of the invention, FIG. 11, when user 2 adjusts security preferences, they are proposed list of parameters for authentication, based on available software and hardware installed on this particular computer 4 for measuring these parameters. For example, if home notebook equipped with pad for inputting signature, but does not have facilities for iris recognition, user 2 will be proposed list that includes signature check parameter, but omits iris check option. Suitably if work computer 4 has camera and software for face recognition procedure, this option will be included into list of available alternatives to traditional authentication.

Figure 12:
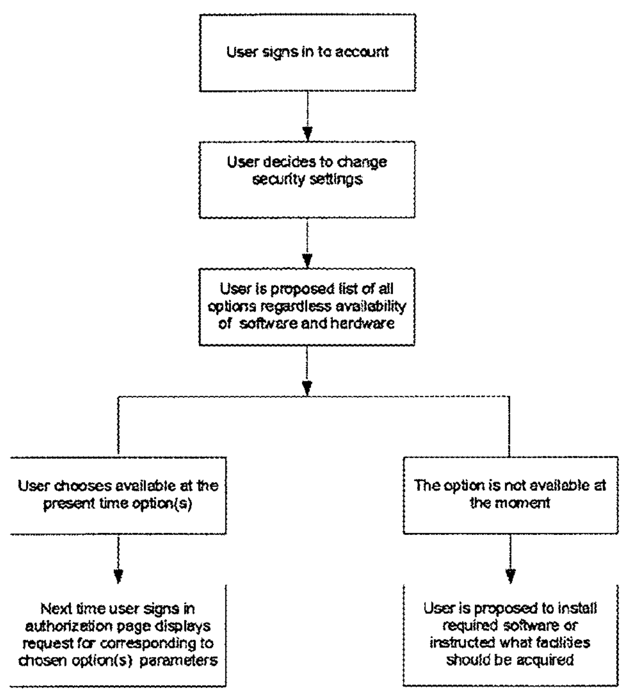
FIG. 12 is a flowchart of the embodiment of invention where authentication option is not available and user gets recommendations as to required software and hardware.

In another embodiment of the invention, FIG. 12, when adjusting security preferences user 2 may choose from the all known options, provided to them regardless on the practical availability of biometric based authentication equipment 9 (software and hardware). In case user 2 chooses option not available for them at the moment they are proposed to install appropriate equipment 9 or instructed what particular facilities should be acquired to make possible alternative authentication check chosen by user 2.

Figure 13:
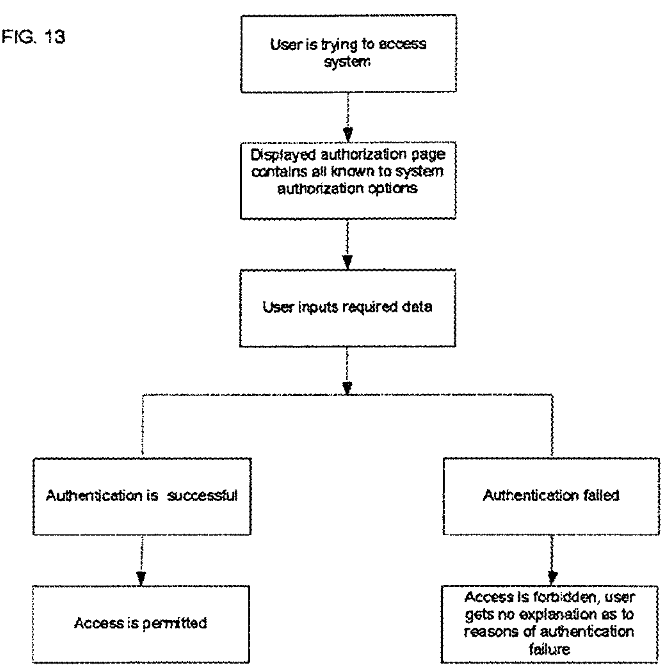
FIG. 13 is a flowchart of the embodiment of invention where authorization page displayed to user contains all methods of authentication familiar for the system.

In FIG. 13 user 2 wants to access to a system that requires authentication. The authorization page 6, displayed to user 2 in this case, contains all methods of authentication that are familiar for this particular system. User 2 enters their name and password or its equivalent (for example, biometric data) for authentication and these parameters are sent to the server 7 at the same time. If authentication is successful, access to the system is permitted, but if authentication is failed, access is forbidden, and user 2 gets no explanation messages from system as to reasons of failure. Thus there is no additional intercommunication between computer 4 and server 7 for user 2 preferences determination which simplifies the procedure for user 2 and makes it more secure.

Figure 14:
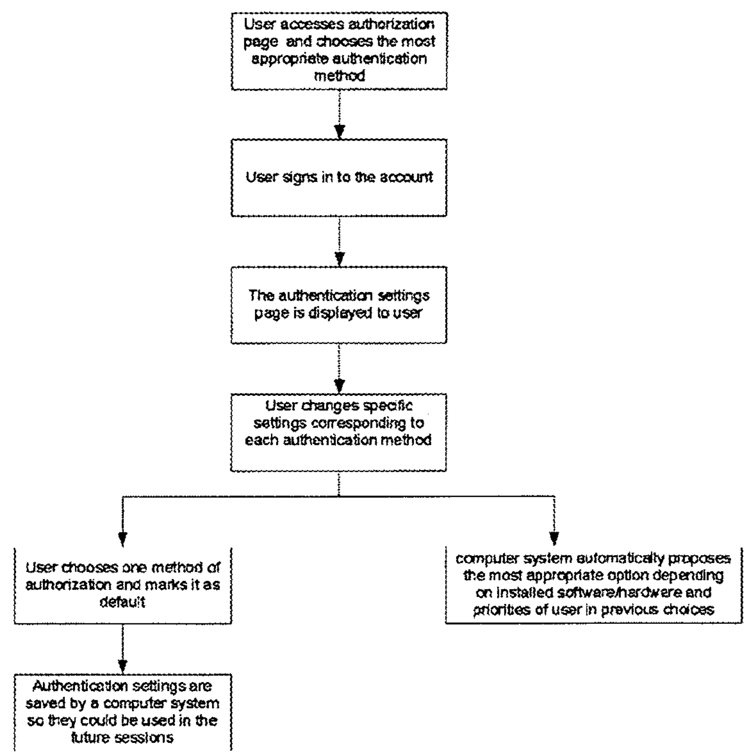
FIG. 14 is a flowchart of the embodiment of invention where user is displayed authentication settings pages, where they can change specific settings corresponding to each authentication method and chooses one method as default.

In FIG. 14 user 2 accesses authorization page 6 and chooses the most appropriate authentication method depending on the type of device and the capacity of authentication hardware 9. User 2 signs in to their account. Then user 2 is displayed authentication settings pages, where they can change specific settings corresponding to each authentication method. User 2 chooses one method of authentication and marks it as default. The chosen authentication settings are saved by a computer system so they could be used in the future sessions. Also instead of choosing default method computer system can automatically propose user 2 the most appropriate option depending on installed software/hardware and priorities of user in previous choices.

The invention is not restricted to the details of the foregoing embodiments. The invention extend to any novel one, or any novel combination, of the features disclosed in this specification (including any accompanying claims, abstract and drawings), or to any novel one, or any novel combination, of the steps of any method or process so disclosed.

What is claimed is:

1. A non-transitory computer-readable medium containing computer-executable instructions that, when executed by a processor, cause the processor to perform a method for providing secure access control of a computer system to identify and authenticate a user to prevent unauthorized access, use and corruption to said computer system by an unauthorized user, the method comprising:

presenting an alternatively organized authorization page and providing a check of a plurality of parameters for user authentication wherein said plurality of parameters are selected from the group consisting of passwords, PIN, speaker recognition (voice), signature and physical parameter including finger prints, presenting an authorization page, acquiring data for authentication upon said user accessing said computer system and using a smart card with a certificate, measuring said plurality of parameters;

providing API to applications and an analysis engine by an analysis data manager; said analysis engine analyzing said data;

converting said plurality of parameters into a signal, processing and data transmission, of said signal, wherein said processing and data transmission of said signal includes increasing the signal to noise ratio of the signal, wherein the signal is suitable for further processing by said processor, and comparing said data.

2. The non-transitory computer-readable medium according to claim 1, where said step of the method of presenting an authorization page comprises a computer or handheld computing device, connected to biometric based authentication equipment and connected to a server and database.

3. The non-transitory computer-readable medium according to claim 1, where said step of the method of acquiring data for authentication comprises a sensor which collects a plurality of biometric data, measures said plurality of biometric data and converts physical parameters into a signal.

4. The non-transitory computer-readable medium according to claim 1, where said step of the method for processing and data transmission comprises amplifier, signal filter and signal isolator.

5. The non-transitory computer-readable medium according to claim 1, where said step of the method for comparing data comprises a matcher comparing current results with previously stored templates.

6. The non-transitory computer-readable medium according to claim 1, where said user authentication comprises login and password check, biometric parameters check, image-based code check, RFID identification, NFIC identification and various combination of said parameters check.

7. The non-transitory computer-readable medium according to claim 6, where the biometric parameters check comprises fingerprint, palm print, face recognition, iris recognition, inputted through digital pad handwritten signatures.

8. A process of adjusting an authorization page depending on user's preferences, comprising:

executing by a processor, a non-transitory computer-readable medium containing computer-executable instructions that cause the processor to perform the process presenting an alternatively organized authorization page;

proposing to the user a list of various methods of authentication, wherein said list of various methods of authentication are selected from group consisting of physiological measures, behavioral measures, and wherein said physiological measures are selected from the group consisting of passwords, PIN, speaker recognition (voice), signature and physical parameter including finger prints, choosing one option or combination of options for authentication;

displaying said chosen option or combination of options next time the user signs in using a smart card with a certificate, measuring said methods of authentication and converting said methods of authentication into a signal when said user accesses said chosen option or combination of options for authentication, providing API to applications and an analysis engine by an analysis data manager;

processing and data transmission, of said signal, wherein said processing and data transmission of said signal includes increasing the signal to noise ratio of the signal.

9. The process according to claim 8, where the user is proposed a list of various methods of authentication, based on available software and hardware installed on a particular computer.

10. The process according to claim 8, where the user is proposed a list of all known methods of authentication, regardless the practical availability of equipment at the moment.

11. The process according to claim 10, where user chooses method of authentication requiring equipment not installed at the moment, and said process instructs which of said equipment should be installed or which particular facilities should be acquired for said method of authentication chosen by the user.

12. The process according to claim 8, where the process further comprises displaying to the user an authorization page containing various methods of authentication, entering a plurality of required biometric parameters for authentication, and determining based on a result of the authentication of said plurality of required biometric parameters to allow or restrict from access to resources of a system.

* * * * *